United States Patent [19]

Coleman

[11] 4,233,605
[45] Nov. 11, 1980

[54] HELICOPTER RADAR DECOY

[75] Inventor: John R. Coleman, Westminster, Calif.

[73] Assignee: Northrop Corporation, Hawthorne, Calif.

[21] Appl. No.: 12,574

[22] Filed: Feb. 15, 1979

[51] Int. Cl.³ .............................................. H01Q 15/18
[52] U.S. Cl. .................................. 343/18 D; 343/18 C
[58] Field of Search ................. 343/18 B, 18 C, 18 D, 343/18 E

[56] References Cited

U.S. PATENT DOCUMENTS

| 2,462,102 | 2/1949 | Istvan | 343/18 R |
| 2,746,035 | 5/1956 | Norwood | 343/18 C |
| 3,010,103 | 11/1961 | Hopper et al. | 343/18 D |
| 3,016,532 | 1/1962 | Del Mar | 343/18 D |
| 3,114,911 | 12/1963 | McNutt | 343/18 D |
| 3,295,132 | 12/1966 | Chapman, Jr. | 343/18 D |

*Primary Examiner*—T. H. Tubbesing
*Attorney, Agent, or Firm*—James E. Crawford; Willard M. Graham

[57] ABSTRACT

A Doppler radar signature simulator decoy for protecting a helicopter under attack by hostile weapons which home in on a Doppler radar return signal from the helicopters rotors. The decoy returns a strong radar signal which duplicates a relatively weaker signal emitted from the helicopter rotors, leading hostile weapons to the decoy.

6 Claims, 6 Drawing Figures

HELICOPTER RADAR DECOY

BACKGROUND OF THE INVENTION

The invention herein described was made in the course of Contract No. DAAJ02-76-C-0059 with the U.S. Army Air Mobility R&D Laboratory.

The present invention relates to helicopter decoys equipped with radar reflectors, and more particularly to means for reflecting a relatively strong Doppler radar signal from a decoy such as towed target or drone. The signal reflected leads missiles aimed at the helicopter to the decoy.

STATEMENT OF THE PRIOR ART

The following patents are cited as the most pertinent prior art of which the applicant is aware:

| U.S. Pat. No. | Name | Date |
| --- | --- | --- |
| 2,462,102 | E. J. Istuan | Feb. 22, 1949 |
| 2,746,035 | V. T. Norwood | May 15, 1956 |

U.S. Pat. No. 2,462,102 (E. J. Istuan) discloses a reflecting and retransmitting antenna unit for reflecting a signal back to a transmitting source. This invention includes a plurality of dipoles which are rapidly rotated by a propeller-like device which is, in turn, rotated by being carried aloft by a balloon or the like.

U.S. Pat. No. 2,746,035 (V. T. Norwood) relates to a trihedral corner assembly, supported in a gimbal assembly, for reflecting ultra-high frequency radiant energy back to its source. The assembly can be carried aloft by a balloon or dropped by parachute to descend to the ground.

BRIEF SUMMARY OF THE INVENTION

The present invention is helicopter-type decoy device which includes cruciform-shaped radar reflective spars forming the main support for an airfoil shaped helicopter rotor blade. The radar return from the decoy rotor duplicates, in character, the radar return from a helicopter and will thus lead attack weapon-guidance systems away from the helicopter to the decoy.

It is an object of the present invention to provide a helicopter decoy which is relatively simple and inexpensive to manufacture.

It is another object of the present invention to provide an expendable decoy for protecting helicopters that are under attack by radar guided missiles.

It is a further object of the present invention to provide a radar reflective return signal which substantially duplicates the radar return of a helicopter rotor.

Other important objectives and advantages of this invention will be apparent from the following description and the appended drawing wherein the preferred embodiments of this invention are set forth.

DETAIL DESCRIPTION OF THE INVENTION

Figure 1:
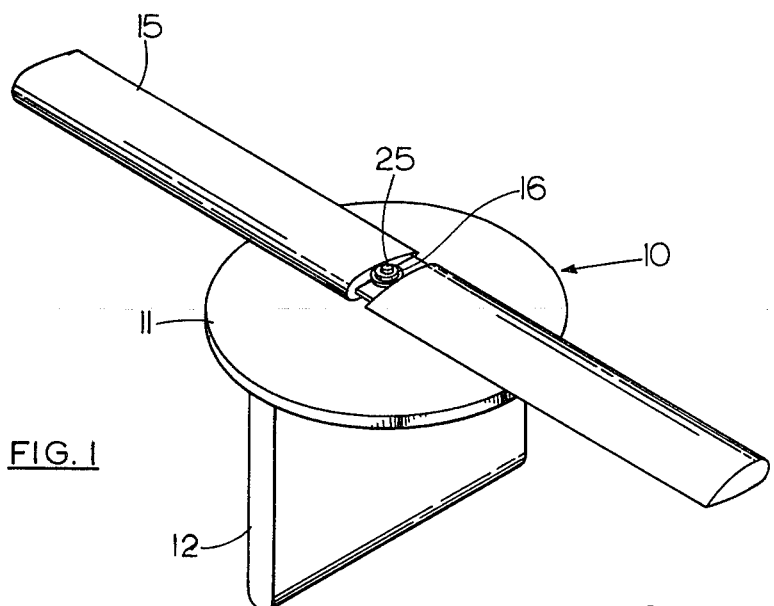
FIG. 1 is a perspective view depicting one embodiment of the present invention.

In a preferred embodiment thereof, the decoy 10 depicted in FIG. 1 comprises a hollow disk 11 provided with a keel 12, and an airfoil or rotor blade assembly 15 rotatably mounted to the top of the disk 11 by means of a rotor shaft 16 mounted in a spool-shaped bearing 25.

Figure 2:
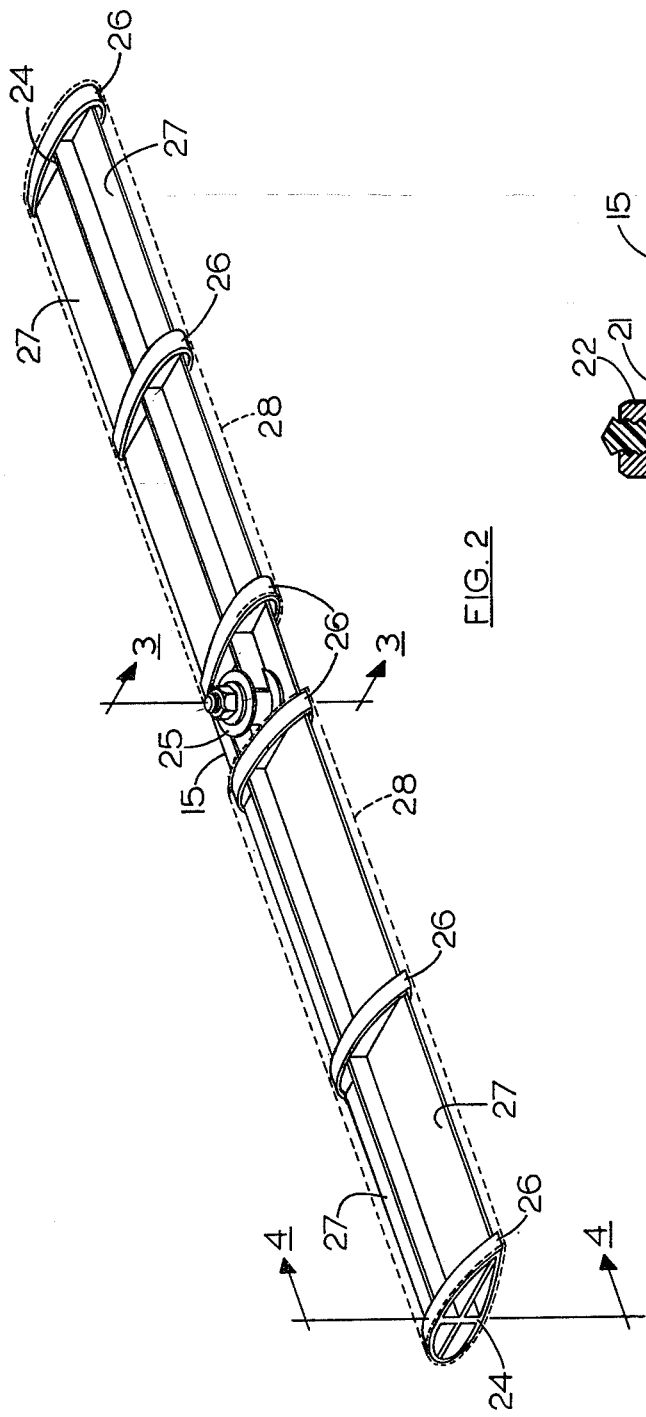
FIG. 2 is a perspective view, partly in phantom, depicting a preferred embodiment of the rotor of the present invention.

Referring to FIG. 2, a preferred method of manufacturing the blade assembly 15 is to first assemble and connect two identical cruciform-shaped spars 24 to opposite sides of the spool-shaped bearing 25. Next, a plurality of bands or stiffeners 26, defining the chord shape of an airfoil, are bonded to the spars 24. After bonding the stiffeners 26 to the spars 24, all exposed surfaces of the spars 24, except for the area of the bearing 25, are covered with aluminum foil 27, or other material such as mirrorized Mylar film, which is capable of reflecting radiant energy impinged thereon. The assembly thus formed is completely covered with an outer skin covering of plastic or fiber glass type material 28, shown in phantom line. The spars 24, bearings 25, and stiffeners 26 may be fabricated of light-weight metal or plastic.

While the cruciform-shaped spars 24 are preferred, it is to be understood that the construction of the retrodirective reflector spars 24 can be formed in other shapes such as "I" beam-"hat"-"X"-"parabolic"-etc., without departing from the spirit of the present invention.

Figure 3:
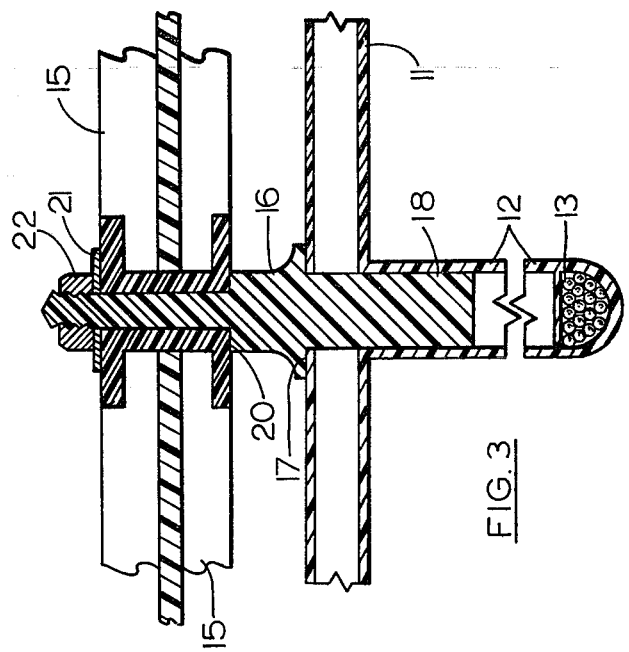
FIg. 3 is an enlarged fragmentary cross-sectional view taken along line 3—3 of FIg. 2.

As shown in FIG. 3, the shaft 16 has one of its ends bonded to both the disk 11 and keel 12, the shaft having an annular shoulder 17 resting on the top surface of the disk 11, integrally formed thereon, the lower end of the shaft 16 terminating in a rectangular end portion 18 which extends downwardly from shoulder 17 and cemented in the keel 12. The other end of the shaft 16 retains the rotor blade assembly 15 between a shoulder 20 located on the shaft 16 and a thrust bearing 21 mounted on the shaft 16 by a lock nut 22. Ballast in the form of lead balls 13, or any other suitable substance, is retained in the lower portion of the keel 12 to stabilize the decoy 10 during its decent to the ground.

Figure 4:
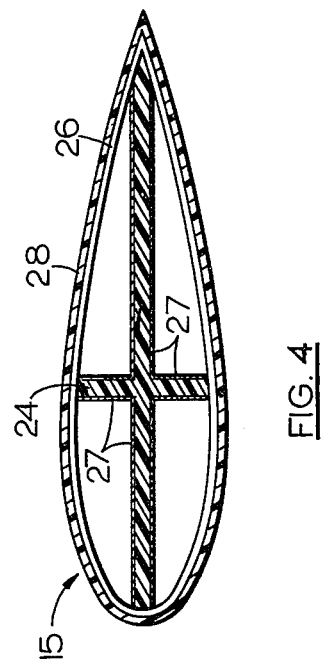
FIG. 4 is a cross-sectional view taken along line 4—4 of FIG. 2.

FIG. 4, is an enlarged view of the rotor blade assembly 15 taken along 4—4 of FIG. 3, better shows the relationship of the cruciform-shaped spar 24 to the aluminum foil 27 as well as its relationship to the stiffeners 26 and the plastic or fiber glass covering 28.

The method of deploying the decoy 10 depicted in FIG. 1 is to carry it aloft in an aircraft and release it over hostile territory area, whereupon the rotor assembly 15 of the decoy 10 will autorotate as the decoy descends to earth duplicating the radar return signals of a helicopter to any Doppler type radar locked thereon.

Figure 5:
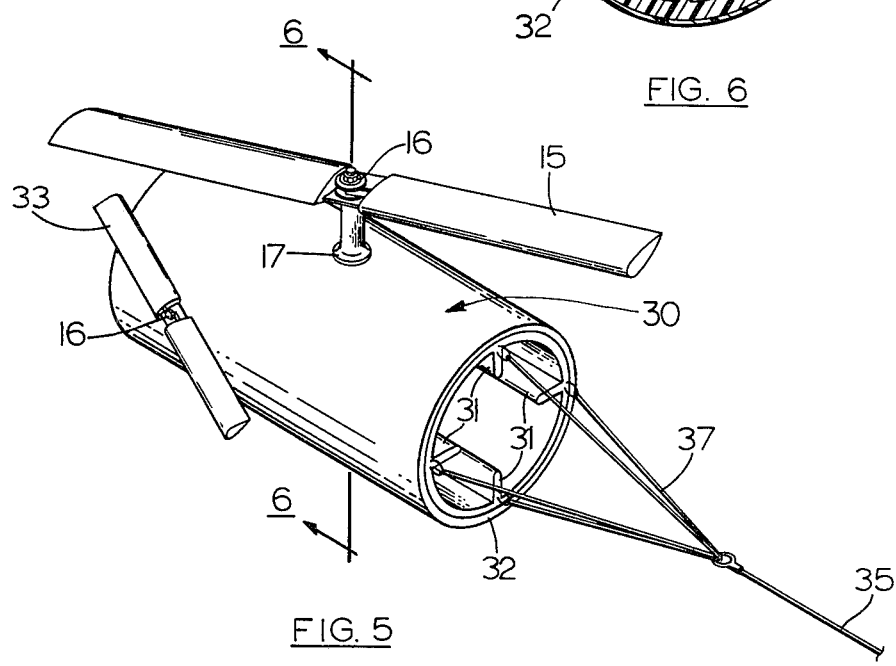
FIG. 5 is a perspective view depicting an alternate embodiment of the invention.

FIG. 5 shows an alternate embodiment of the present invention modified for towing behind a helicopter.

The decoy body 30 preferably takes the form of a hollow cylinder, open at both ends to permit air to flow therethrough. To stabilize the cylindrical body 30 in flight, internal elongated vanes 31 are provided, running from one end of the body 30 to the other.

The cylindrical body 30 preferably is conventionally fabricated of fiber glass 32 bonded over a rigidized lightweight plastic foam core employing techniques which are well known in the plastic industry.

Figure 6:
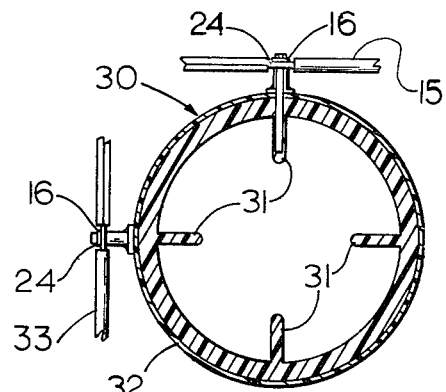
FIG. 6 is a cross-sectional view taken along line 6—6 of FIG. 5.

The rotor shaft is identical to that described and shown in the embodiment of FIGS. 1–3, and is mounted on the top of the body, extending down into, and bonded within, vane 31 of the body (best seen in FIG. 6) The radar reflective rotor assembly 15, which is identical to the rotor assembly of FIGS. 1–3, and is mounted to rotate on the shaft 16 in the same manner.

If desired a radar reflective tail rotor 33 can be added adjacent the trailing end of the decoy body 30, substantially as shown, the rotor shaft 16 being mounted and bonded within vane 31 in the same manner as the main rotor assembly.

One end of a tow cable 35, which is attached at its other end to the helicopter (not shown) is connected to a conventional tow line assembly 37, in any convenient manner, on the leading end of the decoy body.

As with the embodiment of FIGS. 1–3, the entire decoy 30 can be manufactured of low-cost plastic materials making the decoy a relatively inexpensive, expendable item.

While in order to comply with the statute, the invention has been described in language more or less specific as to structural features, it is to be understood that the invention is not limited to the specific features shown, but that the means and construction herein described comprise the preferred mode of putting the invention into effect, and the invention is therefore claimed in any of its forms or modifications within the legitimate and valid scope of the appended claims.

What is claimed is:

1. A Doppler radar decoy comprising:
   (a) a body portion including a disk and keel member depending therefrom;
   (b) rotor shaft means mounted on said body portions; and
   (c) rotor means including an internal retro-directive spar mounted to rotate on said shaft means.

2. The Doppler radar decoy in accordance with claim 1 wherein said keel member includes ballast in the lower portion thereof.

3. A Doppler radar decoy comprising
   (a) a body portion having a hollow cylindrical shape;
   (b) rotor shaft means mounted on said body portion; and
   (c) rotor means including an internal retro-directive spar to rotate on said shaft means.

4. The Doppler radar decoy in accordance with claim 3 wherein said body portion includes two or more internally elongated stabilizing vanes running from one end of said body portion to the other.

5. The Doppler radar decoy in accordance with claim 3 wherein said body portion has a radar reflective tail rotor mounted adjacent to the trailing end thereof.

6. The Doppler radar decoy in accordance with claim 3 wherein said body portion is provided with a tow line assembly attached thereto.

* * * * *